N. J. WIGGINTON.
ANIMAL EXTERMINATOR.
APPLICATION FILED SEPT. 20, 1917.
1,274,123.
Patented July 30, 1918.
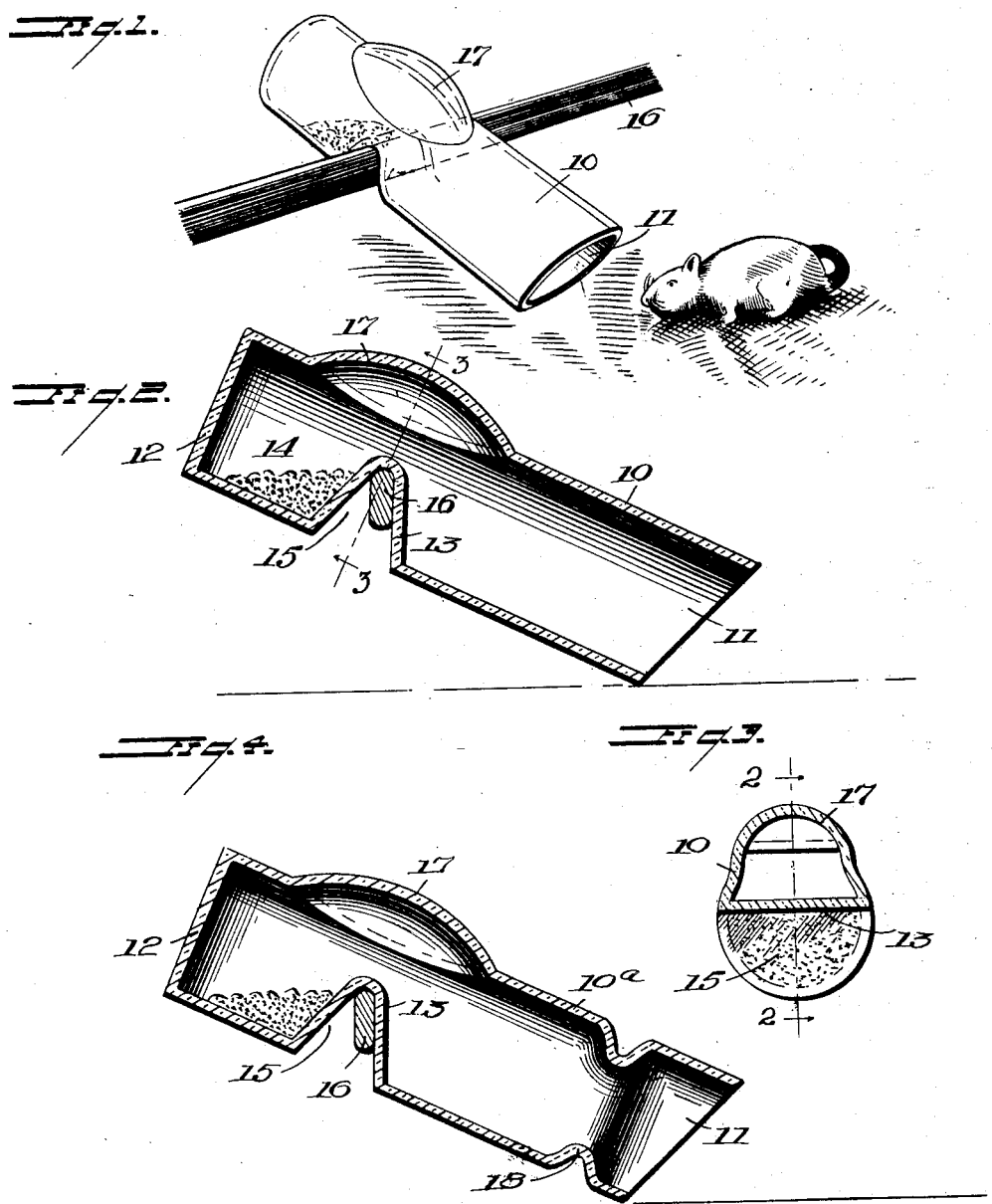
WITNESSES
INVENTOR
Newton J. Wigginton
BY
ATTORNEYS

UNITED STATES PATENT OFFICE.

NEWTON J. WIGGINTON, OF OPEQUON, VIRGINIA.

ANIMAL-EXTERMINATOR.

1,274,123.  Specification of Letters Patent.  Patented July 30, 1918.

Application filed September 20, 1917. Serial No. 192,330.

*To all whom it may concern:*

Be it known that I, NEWTON J. WIGGINTON, a citizen of the United States, and a resident of Opequon, in the county of Frederick and State of Virginia, have invented a new and useful Improvement in Animal Exterminators, of which the following is a specification.

My present invention relates generally to animal exterminators, and more particularly to animal exterminators in the nature of poison bait holders, my object being the provision of a simple inexpensive bait holder capable of use in such manner as to avoid all danger of ingress of rain water or of access to the bait by birds or animals other than those whose extermination is desired.

More particularly, my invention resides in a transparent holder capable of support in such manner as to prevent the ingress of rain water in the field and so formed as to permit of access of only those animals intended to be exterminated, the particular construction of the holder forming a bait holding compartment therein to which only certain animals have free access.

Still more particularly, my invention resides in the details of construction of the bait holder to be now described with reference to the accompanying drawing, forming a part of this specification, and wherein:

Figure 1 is a detail perspective view illustrating the practical application of my invention.

Fig. 2 is a vertical longitudinal section therethrough in operative position.

Fig. 3 is a vertical transverse section taken substantially on line 3—3 of Fig. 2 and Fig. 4 is a view similar to Fig. 2, illustrating a slightly modified form.

Referring now to these figures, my invention contemplates the provision of an animal exterminator in the nature of a generally cylindrical transparent bait holder 10 which in operative position is supported in inclined relation to the surface upon which the lower portion of its open end 11 rests, said open end being preferably beveled as particularly seen in Figs. 2 and 4, in order that when in operative position, the upper portion of the open end will over-hang the lower portion and thus avoid danger of rain water beading upwardly within the holder.

The opposite end 12 of the holder is closed and adjacent to this closed end and at a point intermediate the end thereof, the holder is provided with a transverse partition 13 which thus forms a bait holding compartment 14 between the partition and the closed end 12, elevated substantially above the lower open end of the bait holder and the contents of which are protected from birds and fowls by the partition 13.

The partition 13 as particularly seen in Figs. 2, 3 and 4, is preferably formed integral with the holder in the present instance and is hollow, its hollow 15 opening downwardly at the exterior of the holder 10 so as to form a transverse recess adapted for engagement with an elevated cross-piece 16 of any suitable nature whereby the holder may be supported in operative position in the inclined relation before stated.

The upper section of the holder 10 opposite the partition is, furthermore, pulled outwardly as at 17 in order that those animals which it is desired shall have free access to the bait within the bait holding compartment 14, may have sufficient room to turn and pass out of the open end 11 after partaking of the poisoned bait.

The holder 10 may, of course, be formed in various diameters sufficient only to accommodate those animals which it is desired to exterminate, or for the purpose of holding a material supply of bait, the holder $10^a$ of Fig. 4, otherwise constructed like the holder 10 of Figs. 1 and 2, may be provided with a constriction 18 annularly of the same and adjacent its open end, where its diameter is in the first instance greater than is necessary for the free entrance and exit of those animals it is desired to exterminate, the constriction 18 reducing the bore or animal passage so as to exclude other and larger animals. This feature is merely indicative of the variety of changes which may be made in a bait holder of the present type and still answer the requirement for the device of this nature, it being obvious that as described, my bait holder is fully capable of carrying out the objects first above stated, and that it will be simple and inexpensive in manufacture.

I claim:

An animal exterminator consisting of a cylindrical transparent bait holder open at one end and closed at its opposite end, and having a portion of its wall indented at a point intermediate its ends to form an inner partition projecting diametrically across the same, said indentation forming an outer groove the base of which extends across the holder parallel to its transverse axis, in order to engage a support, and said holder also having a section of its wall opposite to said partition swelled outwardly to provide space for an animal to turn.

NEWTON J. WIGGINTON.

Witnesses:
 JOHN M. HECTE,
 MAUD J. BROWN.